3,364,256
PROCESS FOR PREPARATION OF HIGH
PURITY TEREPHTHALIC ACID
Yataro Ichikawa, Nobuo Suzuki, and Michiyuki Toka-
shiki, Iwakuni-shi, Japan, assignors to Teijin Limited,
Osaka, Japan, a corporation of Japan
No Drawing. Filed Aug. 31, 1965, Ser. No. 484,100
Claims priority, application Japan, Sept. 9, 1964,
39/51,554; Sept. 25, 1964, 39/55,007
2 Claims. (Cl. 260—525)

This invention relates to a process for preparation of a high purity terephthalic acid.

Hitherto linear polyesters having fiber- and film-forming capabilities composed chiefly of polyalkylene terephthalates have been prepared by, first converting terephthalic acid to a dialkyl terephthalate and subjecting it to ester interchange reaction with an alkylene glycol, instead of directly reacting terephthalic acid with an alkylene glycol. The reason why a simple direct esterification method has not been used is mainly that it is very difficult to purify terephthalic acid in the free acid form, while dialkyl terephthalates can be purified with relative ease by such conventional means as re-crystallization and distillation.

However when this method is employed, terephthalic acid must first be esterified to dialkyl terephthalates with alkyl alcohols, and then subjected to an ester interchange reaction with alkylene glycols. This is essentially a circuitous method and it is apparent that it would be advantageous if highly polymerized polyalkylene terephalates could be prepared by a direct esterification of terephthalic acid with alkylene glycols without any intermediate step.

For such polyalkylene terephthalate prepared by the direct esterification method to be water-white and commercially valuable when made into fiber or film, the material terephthalic acid must be refined and has high purity.

Presently employed processes for purification of terephthalic acid on an industrial scale include a process by oxidation with nitric acid or with air in which p-xylene is a starting material, and Henkel process in which phthalic anhydride is a starting material.

Also recently there was proposed a process for preparing terephthalic acid by oxidation of dialkyl benzenes, particularly p-xylene with molecular oxygen in a liquid medium under relatively mild conditions below 150° C., in the presence of a cobaltic compound while the reaction is under progress. As the liquid medium in the above process, generally for example aliphatic monocarboxylic acids of 2–4 carbons or their aqueous solutions are used. As the processes of the above type, there are those which perform the above reaction, for example, (a) in the presence of a methylene ketone such as methyl ethyl ketone (U.S. Patents Nos. 2,853,514 and 3,036,122) (b) using $O_3$ as an initiator, (c) adding an aldehyde such as acetaldehyde (U.S. Patent No. 2,673,217) (d) adding an ether such as diisopropyl ether, and (e) as we proposed earlier, in the presence of a large amount of a cobalt salt. Terephthalic acid prepared by these methods often contains colored impurities and impurities capable of forming colored matters, and therefore are unsuited to produce water-white linear polyesters as directly esterified.

For de-coloration of such crude terephthalic acid, a process of heating a crude terephthalic acid with acetic acid, propionic acid or butyric acid until it is dissolved, and then cooling the solution to crystallize the terephthalic acid has been known. However, the so refined terephthalic acid at the best has an optical density no lower than 0.795.

The optical density used in this invention was determined by the procedure comprising dissolving 1 gram of a sample in a 14% aqueous ammonia solution to give a solution having a volume of 25 cc. and giving it a measurement at 380 m$\mu$ with a cell length of 5 cm.

Whereas, in order to obtain commercially valuable, water-white linear polyesters by direct esterification method, the material terephthalic acid must have an optical density not more than 0.1 preferably below 0.075. Therefore with the above proposed process, the desired degree of purity of terephthalic acid cannot be obtained. There were also processes proposed in the past, in which chemical reagents such as $KMnO_4$, $K_2Cr_2O_7$, $HNO_3$, and chlorine compounds are used as an oxidation agent, or a reducing agent is used. In such cases, however, besides the loss of such chemical reagents, there is such a deficiency that such a reagent or a reaction product therefrom produced during the refining operation tends to enter and remain in the terephthalic acid to degrade its quality, the removal of such impurity being difficult. Thus, the use of these reagents would not be preferable.

Again sufficiently refined terephthalic acid cannot be obtained when a crude terephthalic acid prepared by the oxidation reaction using molecular oxygen in the presence of a cobaltic compound as a catalyst is refined in the known manner as above described.

We noticed that the said method of the production of terephthalic acid by oxidation of p-dialkylbenzenes with molecular oxygen using a cobaltic compound as a catalyst (hereinafter this method is referred to as the "production method of terephthalic acid using a cobaltic compound") is of high interest, and carried out an extensive research on the process for refining a so-produced crude terephthalic acid. As the result, we found that, for refining a crude terephthalic acid prepared by the production method of terephthalic acid using a cobaltic compound, it is advantageous to heat the said crude terephthalic acid in an aliphatic monocarboxylic acid of 2–4 carbons, inclusive. Furthermore we found that at that time the quantitative proportion of the aliphatic monocarboxylic acid or its aqueous solution used as the refining medium to the crude terephthalic acid and the temperature conditions during heating are very closely related to a refining effect.

The present invention is based on such findings, and concerns a process for the preparation of a high purity terephthalic acid which is characterised by the steps of suspending 6 to 100 parts by weight of a crude terephthalic acid separated from a reaction mixture which has been obtained by oxidation of paradialkylbenzene with molecular oxygen in a liquid medium in the presence of a cobaltic compound in 100 parts by weight of at least one aliphatic monocarboxylic acid having 2 to 4 carbon atoms and having a total water content of less than 50% by weight, heating the suspension at a temperature in the range of 180 to 230° C. under the condition such that at least 50% by weight of the fed crude terephthalic acid may be present in the form of a solid phase, and thereafter separating a pure terephthalic acid.

The aliphatic monocarboxylic acid having 2 to 4 carbon atoms which can be used in this invention is selected from the group consisting of acetic ($CH_3COOH$), propionic ($CH_3 \cdot CH_2 \cdot COOH$), n-butyric

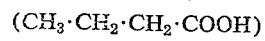

and iso-butyric

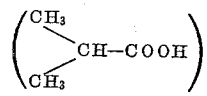

acids, which can be used singly or in mixture.

This invention shall be further explained in detail hereinbelow.

STARTING MATERIAL

The refining process of this invention can be applied to any crude terephthalic acid or terephthalic acid-containing material so far as it is obtained by oxidation of a p-dialkyl benzene with molecular oxygen in a liquid medium in the presence of a cobaltic compound, in any manner as described as (a) through (e) in the above.

Hitherto as the liquid medium mainly aliphatic monocarboxylic acids with 2 to 4 carbon atoms or their aqueous solutions have been used, but in this invention any liquid medium can be used so far as it does not interfere with the terephthalic acid-forming reaction.

For refining the terephthalic acid thus obtained, if the reaction suspension resultant from the oxidation is directly subjected to a refining step, i.e. without first separating the crude terephthalic acid, the refining effect is insufficient and the purpose of this invention cannot be achieved. Therefore in accordance with this invention it is necessary to first separate the crude terephthalic acid from the reaction suspension and use it as a starting material.

In a preferred embodiment, the thus separated crude terephthalic acid may be washed one to several times with a suitable solvent such as water or an aliphatic monocarboxylic acid with 2 to 4 carbon atoms or an aqueous solution thereof, and then used as a starting material in the present process.

REFINING MEDIUM

According to this invention, any of acetic, propionic, and n- and iso-butyric acids can be used as a refining medium as aforesaid, the particularly preferred being acetic acid. The medium usually consists of any one or mixture of the above acids in substantially a pure form, but may be in the form of an aqueous solution of which water content is not more than 50%, preferably not more than 30% by weight. When the water content is more than 50% based on the total weight, the refining effect is lowered and the purpose of this invention cannot be achieved.

As afore-mentioned, when terephthalic acid obtained after oxidation reaction is washed with water or an aliphatic monocarboxylic acid with 2 to 4 carbon atoms before being subjected to a refining treatment, the total water content of the said aliphatic monocarboxylic acid used during refining including the water contained in the crude terephthalic acid after washing should be adjusted to less than 50%.

REFINING CONDITIONS

As has been already pointed out, with respect to the starting material of the present process, the quantitative proportion between the refining medium and the crude terephthalic acid and temperature condition of the refining are very closely related to the refining effect.

We made various studies on the relationship and as the result found that a very high purity terephthalic acid can be obtained by suspending 6 to 100 parts by weight of the said crude terephthalic acid in 100 parts by weight of a refining medium (above-specified monocarboxylic acid or an aqueous solution thereof whose water content is not more than 50% by weight, preferably not more than 30% by weight), maintaining this suspension at a temperature in the range of 180° C. to 230° C. and under a condition such that at least 50% by weight of the fed crude terephthalic acid may be present in the form of a solid phase and directly or after cooling, separating terephthalic acid.

As the said crude terephthalic acid, any of those having a terephthalic acid content of more than 80% by weight can serve the purpose.

For the sake of reference, the solubility of terephthalic acid in acetic acid or an aqueous solution of acetic acid is shown in Table 1.

TABLE 1

| Temperature (° C.) | Solvent | | |
|---|---|---|---|
| | Solubility of terephthalic acid [1] (g.) | Solubility of terephthalic acid [2] (g.) | Solubility of terephthalic acid [3] (g.) |
| 180 | 0.85 | 1.2 | 1.1 |
| 200 | 1.45 | 2.9 | 2.5 |
| 215 | 2.04 | 4.9 | 4.1 |
| 230 | 2.86 | 7.7 | 6.3 |

[1] In 100 g. of acetic acid.
[2] In 100 g. of 50% by weight of an aqueous solution of acetic acid.
[3] In 100 g. of 70% by weight of an aqueous solution of acetic acid (water content being 30% by weight).

Since the solubility of terephthalic acid in acetic acid is very small even at a temperature of 180 to 230° C. which falls within the present invention as understood from Table 1, the refining treatment of the present invention can be carried out at any temperature in the range of 180 to 230° C. when acetic acid is used as a solvent. But because the use of an aqueous solution having a relatively large water content, for instance 50% by weight, gives rise to the increase of the solubility of terephthalic acid, it is necessary to adjust the amount of a crude terephthalic acid fed and the heating temperature in order that at least 50% by weight of the fed crude terephthalic acid may be suspended in the solvent in the form of a solid phase, especially when an amount of the crude terephthalic acid is small for that of the solvent.

When other aliphatic monocarboxylic acids usable in this invention are employed as a solvent, the refining treatment of the present invention should also be carried out while adjusting an amount of a crude terephthalic acid fed and the heating temperature so that at least 50% by weight, particularly preferably at least 70% by weight, of the crude terephthalic acid added to a solvent may be present in the form of a solid phase and the solid phase portion may be suspended in the said solvent.

The reason why 100 parts by weight of an aliphatic monocarboxylic acid having a water content of less than 50% by weight is used in this invention to 6 to 100 parts by weight of a crude terephthalic acid is that if an amount of the crude terephthalic acid fed is less than 6 parts by weight, an economical efficiency is lost and a refining effect is lowered, and that if the amount exceeds 100% by weight, an operation such as stirring becomes very difficult and a refining effect is likewise lowered.

In the refining treatment of the present invention, the treating system may be closed or the atmosphere in the system may be replaced by such an inert gas as carbon monoxide, carbon dioxide, nitrogen, argon, helium, hydrogen and such lower hydrocarbon as methane, ethane, propane and butane.

The pressure in the practice of the present invention may be any pressure at which at least a portion of a solvent can be maintained liquid. The total pressure in the system is shown by a vapour pressure of a solvent plus a partial pressure of an inert gas present. Any pressure which satisfies the above-mentioned condition suits the purpose, but in general a pressure in the range of 5 atmospheres to 100 atmospheres is preferable.

The time needed for purification, expressed in terms of the time during which the system is maintained at a temperature within the above-mentioned range, is 5 minutes to 5 hours, particularly 30 minutes to 3 hours.

The suspension obtained by the heat-treatment in accordance with the present invention is directly, or after cooling, subjected to a known solid-liquid separating operation such as filtration and centrifugal separation, by which it is possible to separate and recover a purified terephthalic acid.

The separation of terephthalic acid is more easily effected after the said suspension after heat treatment has been cooled. The suitable cooling temperature in this case is lower than the temperature employed in the treatment, lower than the boiling point of the refining medium used generally and higher than the melting point.

When a relatively high temperature near the boiling point of the refining medium is employed, a refining effect is particularly good. The cooling may be done rapidly or gradually, but in general a gradual cooling is often better. The terephthalic acid in the suspension obtained by cooling is separated by a known method such as filtration and centrifugal separation, and if occasion demands, washed with water, a refining medium or a mixture of these to give a purified terephthalic acid.

The process of the present invention can be carried out either batch-wise or continuously.

Thus, in accordance with the present invention, a crude terephthalic acid obtained by oxidation of p-dialkyl-benzene with molecular oxygen in a liquid medium in the presence of a cobaltic compound can be refined to a high purity with ease of operation. The terephthalic acid refined in accordance with the present invention, even if directly reacted with a divalent alcohol such as ethylene glycol, can give a polyester having an excellent whiteness.

Below are given the examples of the present invention. The parts and percentages used throughout the examples are expressed by weight.

*Examples 1–7 and controls 1–3*

A stainless steel pressure reactor equipped with a gas inlet at its lower part and a stirrer was charged with 20 parts of p-xylene, 130 parts of acetic acid and 20 parts of cobaltic acetate $(Co(OCOCH_3)_2 4H_2O)$. While maintaining the system at 120° C., air was passed into the reactor at the rate of 0.0095 mol (mol of p-xylene charged) (min.), in terms of oxygen, at the pressure of 20 kg./cm.$^2$ G with a stirring of 1200 r.p.m.

The reaction was continued until substantially no absorption of oxygen was observed, and thereafter the reaction mixture was taken out, followed by separation of a solid from the reaction mixture by means of centrifuge. The solid was washed with a small amount of glacial acetic acid, and further was mixed with three weight times of the solid of glacial acetic acid. The mixture was heated to boil for 20 minutes under reflux at atmospheric pressure, filtered while hot, and the solid was once more subjected to the above reflux treatment, hot-filtered, and washed.

The thus obtained terephthalic acid (optical density=0.480)

was put in a titanium pressure vessel together with refined glacial acetic acid at the ratios in Table 1, into which nitrogen was introduced to a pressure of 10 kg./cm.$^2$ G, and the mixture was stirred for 1 hour at 200° C.

Thereafter the mixture was quenched to 115° C. at the cooling rate of 26° C./min., and the content was taken out, filtered, washed with refined glacial acetic acid, boiled with distilled water, filtered, washed with distilled water, and dried. The so refined terephthalic acid had optical densities (O.D.) as in Table 2 below.

TABLE 2

| Example or Control No. | Crude terephthalic Acid charged (part) | Glacial acetic acid charged (part) | Ratio of undissolved portion of crude terephthalic acid charged (percent) | Optical density of refined terephthalic acid |
|---|---|---|---|---|
| Control 1 | 3.1 | 100 | 51.4 | 0.166 |
| Control 2 | 5.3 | 100 | 74.5 | 0.119 |
| Example 1 | 6.4 | 100 | 76.6 | 0.097 |
| Example 2 | 11.1 | 100 | 86.5 | 0.096 |
| Example 3 | 17.7 | 100 | 91.5 | 0.083 |
| Example 4 | 25.0 | 100 | 94.0 | 0.078 |
| Example 5 | 42.9 | 100 | 96.3 | 0.086 |
| Example 6 | 53.9 | 100 | 97.1 | 0.092 |
| Example 7 | 100.0 | 100 | 98.4 | 0.099 |
| Control 3 | 122.0 | 100 | 98.7 | 0.108 |

*Examples 8–13 and controls 4–8*

A titanium pressure reactor was charged with 15% by weight of a crude terephthalic acid prepared in the manner mentioned in Examples 1–7 (optical density being 0.230) and 85% by weight of a glacial acetic acid, and nitrogen was introduced to a pressure of 12 kg./cm.$^2$ G.

The system was maintained at temperature as indicated in Table 3 and stirred for 2 hours. The reaction product was treated in the same manner as mentioned in Examples 1–7. The optical densities of the so obtained purified terephthalic acids are shown in Table 3.

TABLE 3

| Example or Control No. | Refining temperature (° C.) | Ratio of undissolved portion of crude terephthalic acid (percent) | Optical density of refined terephthalic acid |
|---|---|---|---|
| Control 4 | 170 | 96.0 | 0.141 |
| Control 5 | 175 | 95.5 | 0.119 |
| Example 8 | 180 | 95.0 | 0.098 |
| Example 9 | 190 | 93.7 | 0.096 |
| Example 10 | 200 | 91.6 | 0.083 |
| Example 11 | 210 | 89.7 | 0.072 |
| Example 12 | 220 | 87.0 | 0.080 |
| Example 13 | 230 | 83.8 | 0.095 |
| Control 6 | 235 | 81.9 | 0.137 |
| Control 7 | 240 | 79.7 | 0.362 |
| Control 8 | 260 | 66.0 | 1.056 |

*Examples 14–16*

A stainless steel pressure reactor provided with a feed gas inlet at its lower part and a stirrer was charged with 20 parts of p-xylene, 130 parts of acetic acid and 20 parts of cobaltic acetate. While the system was being maintained at 120° C., air was passed into the reactor at the rate of 0.0095 mol (mol of p-xylene charged) (min.), in terms of oxygen, at the pressure of 20 kg./cm.$^2$ G with a stirring of 120 r.p.m.

The reaction was continued until substantially no absorption of oxygen was observed, and at the completion of the reaction, the reaction mixture was taken out, followed by separation of a solid from the reaction mixture by means of centrifuge. The solid was washed with a small amount of a glacial acetic acid, and further was mixed with three weight times, based on the solid, of a glacial acetic acid. The mixture was heated to boil for 20 minutes under reflux at atmospheric pressure, filtered while hot, and the solid was once more subjected to the above-mentioned reflux treatment, hot-filtered, and washed. Thus, a crude terephthalic acid was obtained.

Eighteen parts of the thus obtained crude terephthalic acid (optical density being 0.186) and 100 parts of a purified glacial acetic acid were put in a titanium pressure reactor, into which hydrogen was introduced to a pressure of 10 kg./cm.$^2$ G. The system was maintained at each of the temperature indicated in Table 4 and stirred for 1 hour.

Thereafter, the mixture was quenched to 115° C., and the content was taken out and filtered. The terephthalic acid was washed with a refined glacial acid, boiled together with a distilled water, filtered, again washed with a distilled water, and dried. The so obtained refined terephthalic acid exhibited whiteness, and each of the measured optical densities is shown in Table 4. A high polymer obtained by a direct esterification of the so obtained terephthalic acid with ethylene glycol was water-white.

TABLE 4

| Example No. | Refining temperature (° C.) | Ratio of undissolved portion of crude terephthalic acid (percent) | Optical density of refined terephthalic acid |
|---|---|---|---|
| 14 | 180 | 95.0 | 0.037 |
| 15 | 200 | 92.0 | 0.033 |
| 16 | 220 | 87.3 | 0.035 |

Example 17

A stainless steel pressure reactor having a gas inlet at its lower part and which was equipped with a stirrer was charged with 20 parts of p-xylene, 130 parts of acetic acid, 4.72 parts of cobaltic acetate ($Co(OAc)_2 \cdot 4H_2O$) and 13.6 parts of methyl ethyl ketone. While maintaining the system at 120° C., air was passed into the reactor at the rate of 0.01 mol/mol of p-xylene charged min., in terms of oxygen, at the pressure of 20 kg./cm.$^2$ G with a stirring of 1200 r.p.m. The reaction was continued until substantially no absorption of oxygen was observed, and thereafter the reaction mixture was taken out, followed by separation of a solid from the reaction mixture by means of centrifuge. The solid was washed with a small amount of glacial acetic acid, and further was mixed with four weight times, based on the solid, of a glacial acetic acid. The mixture was heated to boil at atmospheric pressure for 30 minutes under reflux, hot-filtered, and the remaining solid was once more subjected to the above reflux treatment, hot-filtered and washed to thereby give a crude terephthalic acid.

Twenty parts of the thus obtained crude terephthalic acid (O.D.=0.330) and 100 parts of a glacial acetic acid were put in a titanium pressure vessel, into which nitrogen was introduced to a pressure of 10 kg./cm.$^2$ G. The whole system was maintained at 210° C. and stirred for an hour. Then the content was quenched to 115° C. and taken out of the vessel, filtered, washed with a refined glacial acetic acid, boiled with a distilled water, filtered, washed with a distilled water and dried. The so obtained refined terephthalic acid had an optical density of 0.059.

Example 18

A crude terephthalic acid was prepared in accordance with Examples 1–7 with the use of propionic acid instead of acetic acid. The obtained crude terephthalic acid having an optical density of 0.481 was refined in the same manner as in Example 17. The so obtained refined terephthalic acid had an optical density of 0.031.

Example 19

The starting materials were put in the same manner as in Examples 1–7. After $O_3$ was passed into a reactor for 30 minutes, air was introduced and the same treatment as in Examples 1–7 was effected. The thus obtained crude terephthalic acid (optical density being 0.407) was treated in the same manner as in Example 18. The obtained refined terephthalic acid had an optical density of 0.072.

Example 20

Thirty parts of acetaldehyde were used instead of methyl ethyl ketone in Example 18. For the first 2 hours, the system was maintained at 50–60° C. and thereafter at 115° C. Other conditions were the same as in Example 17. The obtained crude terephthalic acid (optical density being 0.655) was treated in the same manner as in Example 17. The so obtained refined terephthalic acid had an optical density of 0.085.

Examples 21–23

The crude terephthalic acid prepared in Examples 1–7 was refined in the same manner as in Example 18 with the use of the solvents mentioned in Table 5. Results are shown in Table 5.

TABLE 5

| Example No. | Solvent | Optical density of refined terephthalic acid |
|---|---|---|
| 21 | Water (15%) / Acetic acid (85%) | 0.073 |
| 22 | Propionic acid | 0.081 |
| 23 | Butyric acid | 0.088 |

*Control 9.*—An autoclave was charged with substantially anhydrous dipotassium phthalate (100 parts) and $CdCl_2$ (3 mol percent to the dipotassium phthalate), and was maintained at 435° C. in $CO_2$ atmosphere at the pressure of 5 kg./cm.$^2$ G for an hour. Thereafter the autoclave was air-cooled, and the content was dissolved in water to form a 10–15% solution, and filtered. Hydrochloric acid was added to the filtrate, and a precipitated terephthalic acid (optical density being 1.43) was treated in the same manner as in Example 17. The obtained refined terephthalic acid had an optical density of 0.570 and was coloured in reddish brown.

*Control 10.*—A titanium pressure reactor having a gas inlet at its lower part and which was equipped with a stirrer was charged with 40 parts of p-xylene, 120 parts of acetic acid and 20 parts of manganous bromide ($MnBr_2 \cdot 4H_2O$). While maintaining the system at 190° C., air was passed into the reactor at the rate of 0.1 mol (mol. p-xylene) (min.) in terms of oxygen, at 30 kg./cm.$^2$ G with a stirring of 1200 r.p.m. The reaction was contined until substantially no absorption of oxygen was observed, and thereafter the reaction mixture was taken out, followed by separation of a solid from a reaction mixture by means of centrifuge. The solid was washed with a small amount of glacial acetic acid, and further was mixed with four weight times thereof of glacial acetic acid. The mixture was heated to boil under reflux at atmospheric pressure for 20 minutes, hot-filtered, and the remaining solid was washed.

The thus obtained crude terephthalic acid (O.D.=0.689) was treated as in Example 17. The resulting refined terephthalic acid had an optical density of 0.557 and was yellow-tinted.

*Control 11.*—The reaction mixture obtained by oxidation of p-xylene under the same conditions as in Examples 1–7 was left in the reactor as it was, and the inside pressure of the reactor was raised to 11 kg./cm.$^2$ G (partial pressure of nitrogen=10 kg./cm.$^2$ G, partial pressure of acetic acid=1 kg./cm.$^2$ G) by substituting nitrogen for air. The reaction mixture was thereafter cooled to 110° C. The content was taken out and filtered. The thus obtained crude terephthalic acid was washed with a refined glacial acetic acid, boiled with a distilled water, filtered, again washed with a distilled water, and dried. The resultant terephthalic acid had an optical density of 0.304, and was colored yellow.

Example 21

The crude terephthalic acid (optical density being 0.22) prepared in accordance with Examples 1–7 and a glacial acetic acid were mixed in a weight proportion of 15 to 85. The mixture was stirred and the terephthalic acid was completely suspended. It was then fed continuously into a titanium purifining column having a capacity of 2 litres at a feed rate of 1.5 l./hr. The temperature and the pressure in the purifining column were adjusted to 210° C. and 21 kg./cm.$^2$ G, respectively, and the slurry was continuously taken out. The slurry and a vapor of acetic acid having a high temperature were treated in a stirred tank equipped with a cooling jacket, thoroughly cooled, and taken out of the system. The slurry was treated in the same manner as in Examples 1–7 and thus a refined terephthalic acid having an optical density of 0.062 was obtained.

Examples 25–29

The crude terephthalic acid prepared in accordance with Examples 1–7 was refined under the same conditions as in Example 17 with the use of each of the atmospheric gases indicated in Table 6. Results are shown in Table 6.

TABLE 6

| Example No. | Introduced atmospheric gas | Optical density of refined terephthalic Acid |
|---|---|---|
| 25 | None | 0.070 |
| 26 | CO | 0.067 |
| 27 | $CO_2$ | 0.065 |
| 28 | Argon | 0.073 |
| 29 | Helium | 0.075 |

*Example 30*

A crude terephthalic acid was prepared in a pure acetic acid in a manner such that the terephthalic acid content was 20%. The obtained slurry was washed for 20 minutes while boiling, and the solid was separated from the slurry. The obtained cake was dried. The cake and a pure acetic acid were put in a titanium autoclave in a proportion indicated in Table 7 below. The mixture was refined for 1 hour at 210° C. with an initial nitrogen pressure of 12 kg./cm.$^2$ G. It was then quenched and the solid was separated from the reaction mixture. The cake was mixed further with a pure acetic acid until the slurry had a content of 20%. This slurry was washed for 20 minutes while boiling, and the solid was separated from the liquid. The cake was dried to give a refined terephthalic acid having an optical density as indicated in Table 7.

TABLE 7

| Slurry concentration | | | Proportion of undissolved portion of fed crude terephthalic acid (percent) | Optical density of refined terephthalic acid |
|---|---|---|---|---|
| Terephthalic acid (g.) | Acetic acid (g.) | Wt. percent | | |
| 12.0 | 188.0 | 6.0 | 73 | 0.044 |
| 30.0 | 170.0 | 15.0 | 90 | 0.032 |

*Example 31*

Eighty-five parts of a pure acetic acid was added to 15 parts of a crude terephthalic acid, and the mixture was treated for 20 minutes while the acetic acid was boiling. Thereafter, the solid was separated from the mixture. The obtained cake was dried. Eighty-five grams of acetic acid was added to 15 g. of the dried terephthalic acid. The mixture was put in a 500 cc. autoclave, and refined for 1 hour at 210° C. with an initial air pressure of 12 kg./cm.$^2$ G. Thereafter, it was quenched and the solid was separated from the liquid. The cake was once again washed under the same conditions as the crude terephthalic acid, and dried. The optical density of the obtained terephthalic acid was measured in an aqueous ammonia. Results are shown in Table 8.

TABLE 8

| Refining medium | Water content (Percent) | Optical density |
|---|---|---|
| Glacial acetic acid | 0 | 0.021 |
| Aqueous solution of acetic acid | 10 | 0.020 |
| Do | 30 | 0.025 |
| Do | 38 | 0.48 |

What we claim is:
1. A process for the preparation of a high purity terephthalic acid which comprises the steps of suspending 6 to 100 parts by weight of a crude terephthalic acid separated from a reaction mixture which has been obtained by oxidation of para-dialkylbenzene with molecular oxygen in a liquid medium in the presence of a cobaltic compound, in 100 parts by weight of at least one alkanoic acid having 2 to 4 carbon atoms and having a total water content of less than 50% by weight, heating the suspension at a temperature in the range of 180 to 230° C. under the condition such that at least 50% by weight of the fed crude terephthalic acid may be present in the form of a solid phase, and thereafter separating terephthalic acid.

2. A process for the preparation of a high purity terephthalic acid which comprises the steps of suspending 20 to 80 parts by weight of a crude terephthalic acid separated from a reaction mixture which has been obtained by oxidation of para-alkylbenzene with molecular oxygen in a liquid medium in the presence of a cobaltic compound, in 100 parts by weight of acetic acid having a total water content of less than 30% by weight, heating the suspension to a temperature in the range of 180 to 230° C., and thereafter separating terephthalic acid.

References Cited

UNITED STATES PATENTS 3,171,856    3/1965    Kurtz _____ 260—525

FOREIGN PATENTS 799,181    8/1958    Great Britain.

HENRY R. JILES, *Primary Examiner.*